United States Patent [19]

Villarreal et al.

[11] Patent Number: 4,950,035
[45] Date of Patent: Aug. 21, 1990

[54] ROTATING AIR INCUDING SCOOPS

[76] Inventors: Richard Villarreal, 1720 Gotham St.; John R. Stewart, III, 1716 Gotham St., both of Chula Vista, Calif. 92013

[21] Appl. No.: 315,274

[22] Filed: Feb. 23, 1989

[51] Int. Cl.$^5$ ............................................. F16D 65/78
[52] U.S. Cl. .............................. 301/6 CS; 301/37 H; 188/264 AA
[58] Field of Search .............. 301/6 CS, 37 R, 37 TP, 301/37 PB, 37 C, 37 CD, 37 H; 188/264 AA, 264 W

[56] References Cited

U.S. PATENT DOCUMENTS

| | | | |
|---|---|---|---|
| 2,088,967 | 8/1937 | Main | 301/6 CS |
| 2,248,707 | 7/1941 | Horn | 301/6 CS |
| 2,754,939 | 7/1956 | Hibbard | 188/264 W |
| 3,051,276 | 8/1962 | Lyon | 301/6 CS |
| 3,168,348 | 2/1965 | Fleming et al. | 301/6 CS |
| 4,135,764 | 1/1979 | Johnson | 301/6 CS |
| 4,725,100 | 2/1988 | Patti | 301/37 R X |

FOREIGN PATENT DOCUMENTS

| | | | |
|---|---|---|---|
| 59-124401 | 7/1984 | Japan | 301/6 CS |
| 61-81202 | 4/1986 | Japan | 301/37 H |
| 755909 | 8/1956 | United Kingdom | 301/6 CS |

Primary Examiner—Russell D. Stormer

[57] ABSTRACT

A device for cooling the wheel assemblies of heavy duty vehicles such as trucks, trailers, and buses. The invention being comprised of air inducing scoops attached to air holes on the outboard side of a wheel disk. Upon rotation of the wheel, a powerful heat dissipating burst of air is generated, and then directed through air holes of the wheel disk and over the braking structure requiring no power except the rotation of the wheel for drawing air therethrough.

3 Claims, 4 Drawing Sheets

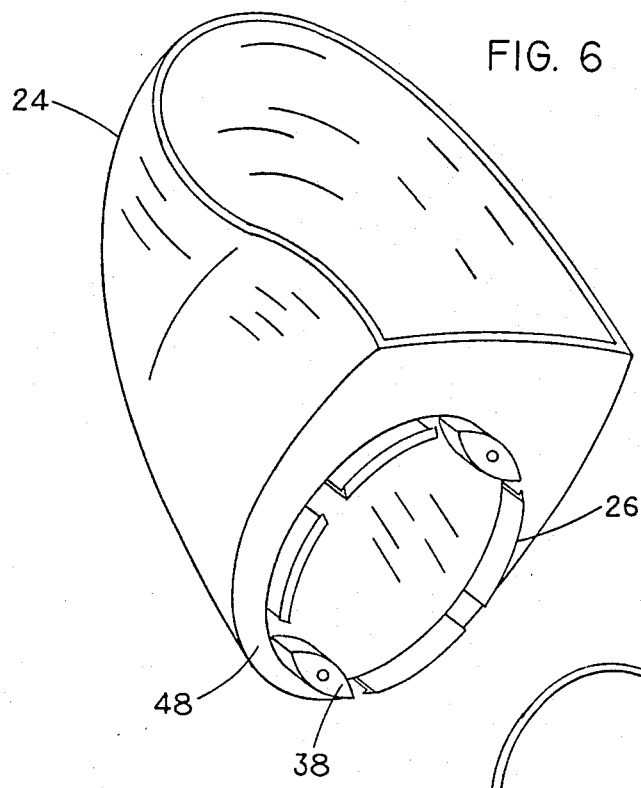
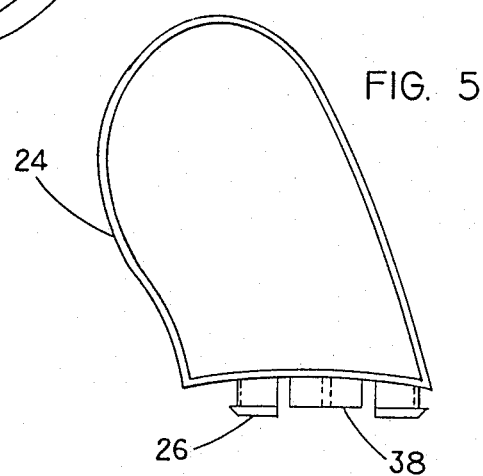
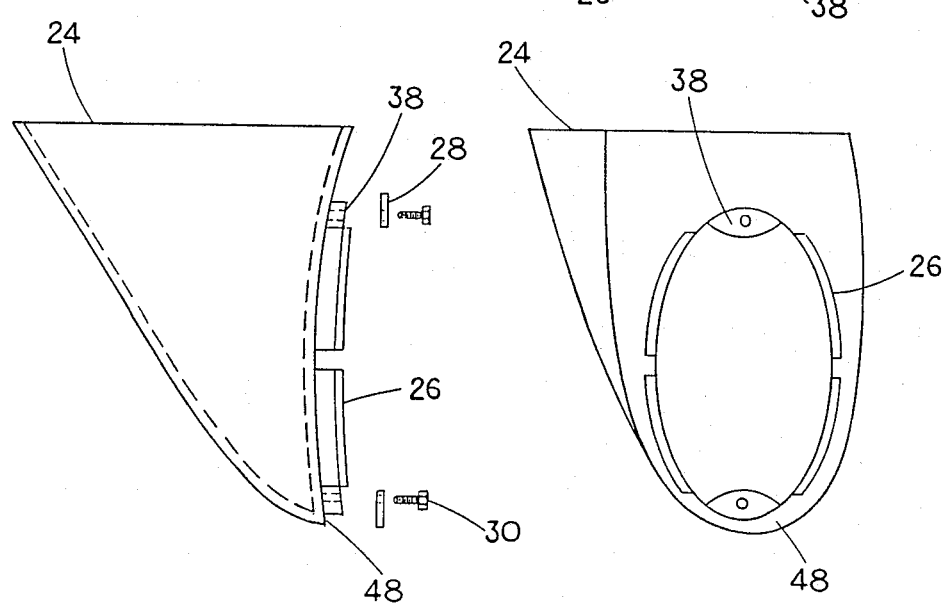

ROTATING AIR INCUDING SCOOPS

BACKGROUND

1. Field of Invention

This invention relates to improvements in the cooling of wheel assemblies and more specifically the cooling of the braking structures of the wheels of automotive vehicles.

Rolling wheels on moving vehicles, and particularly heavy vehicles such as trucks, trailers, and buses, especially in city transit opertion and on long hauls, generate considerable and sometimes excessive heat. This heat develops from friction in the application of the brakes, friction in the bearings, and the continual flexing of the ground-engaging portions of the tires. Furthermore, this mechanically developed heat is supplemented by the radiation from the sun and the hot pavement on hot days, the weight of the load being hauled, traveling speeds, and the sometimes continuous application of the brakes while descending steep grades, particularly in mountainous areas. As a result, tires on some trucks, trailers, and buses, especially in city transit operation and on long hauls, are wearing prematurely and failing before reaching the expected life of the tire. Failure of brakes due to overheating is also known to be a particular problem.

2. Description of Prior Art

Heat generated from wheel assemblies and brake structures on automotive vehicles, especially trucks, trailers, buses, and other heavy duty type vehicles is a well known problem.

Heretofore a wide variety of wheel assembly cooling means have been proposed and implemented for the resolution of the above mentioned heat problems. Some of these have merely provided air openings through wheel disk and/or hub caps. Others have involved baffled surfaces to promote air flow through such air openings, usually as a part of a hub cap structure, and thus are not well adapted for heavy duty applications because the design of heavy duty wheels in common manufacture provide no standard means for hub cap attachment.

One such invention incorporated the use of a fan like structure (U.S. Pat. No. 3,168,348 Patented Feb. 2, 1965) mounted on the wheel co-axially of the hub for rotation therewith. The fan preferably comprised any desired number of blades, and was located within the outboard rim to increase the efficiency of the fan by directing all of the air flow axially of the fan.

Another cooling invention related to improvements in wheel structures by exposing a substantial central portion of the brake drum for heat dissipation at the outer side of the wheel (U.S. Pat. No. 3,051,276 Patented Aug. 28, 1962). In order to enhance heat dissipating and transfer value of the brake drum, the wheel body was specifically constructed for air circulation therethrough and in cooling relation to the brake drum therebehind.

Yet another cooling invention (U.S. Pat. No. 4,135,764 Patented Jan. 23, 1979) embodied air impelling vanes which were mounted in between the innermost and outermost wheels comprising a dual wheel construction. Upon rotation, the air vanes impelled air in the direction towards the hub.

Unlike the above mentioned patents, our invention differs in that each individual air inducing scoop attaches independently of one another to air holes on the outboard side of the wheel disk of the innermost wheel in a dual wheel assembly. The air inducing scoops then extend to fill the space between the innermost and outermost wheels to collect air upon rotation, and then direct that air as a powerful burst through the air holes of the wheel disk of the innermost wheel and over the braking structure to dissipate heat. On a single wheel construction, the air inducing scoops attach independently of one another to air holes of the wheel disk on the outboard side of the single wheel. Upon rotation, the air inducing scoops direct a powerful burst of air through the air holes of the wheel disk and over the braking structure to dissipate heat.

One invention (U.S. Pat. No. 2,754,939 Patented July 17, 1956) incorporates a strategy of cooling vehicle wheels that is somewhat similar in objectives, however is different in description and operation than our invention. The patent (U.S. Pat. No. 2,754,939) involved the use of air scoops attached to a wheel to impel a strong current of air through the wheel to ventilate a brake drum associated with the wheel. The air scoops are arranged in pairs with a pair for each air hole and each pair comprises an inboard scoop and an outboard scoop. In operation, increased air flow over the brake drum is generated as air scoops fastened to air holes on the outside of the wheel disk pick up air and create pressure, while air scoops fastened to air holes on the inside of the wheel disk create a vacuum.

Our invention differs from U.S. Pat. No. 2,754,939 in several respects. For one, our invention utilizes one-piece air inducing scoops that attach to air holes on the outboard side of a wheel disk to form a cup over the entire air hole in order to maximize the amount of air flow that can be impelled through the air hole. The prior art form (U.S. Pat. No. 2,754,939) is illustrated as being constructed out of two separate cups or louvers; an outboard scoop covering approximately 50% of the air hole, and an inboard scoop covering the remaining 50%, but in an inverted position with respect to the location of the outboard scoop. In addition, the openings of the inboard and outboard scoops face in opposite directions. The intention of this "dual scoop per air hole " design is to create an effective flow of air while the wheel is rotating by reason of the louvers at one side of the wheel disk picking air and creating a pressure and the louvers at the other side creating a vacuum. We have found by testing our invention, that in most cases, the wheel assemblies of vehicles that can benefit from our invention do not have sufficient area between the braking structure and wheel on the inboard side of the wheel to allow an inboard scoop or louver to be attached. This technicality prompted us to design our invention as a single air inducing scoop mounted on the outboard side of the wheel disk. And because our invention utilizes a single air inducing scoop per air hole, it is not an object of our invention to create a vacuum, by means of an inboard mounted scoop, to aid in cooling wheel assemblies.

The prior patents we have found do not appear to be well adapted, if at all, for effective action to circulate air through the air holes standard to wheel disks of existing manufacture for heavy duty vehicles of both single and dual wheel assemblies.

Furthermore, the cost of our invention will be less than the above mentioned prior art forms because our invention will be constructed out of heat-resistant durable plastic, readily adaptable to low cost plastic forming procedures as opposed to the often expensive metal fabricating processes required to fabricate the prior art forms we discovered. Moreover, because the air inducing scoops are constructed out of heat-resistant durable plastic, they will also be light in weight and less likely to adversely affect the balance of the wheels.

In addition, unlike some prior art forms, our invention has been designed for easy installation. The air inducing scoops can be readily attached on the outboard side of the wheel to air holes of the innermost wheel disk in a dual wheel assembly by means of several built-in sturdy plastic clips, and additional metal fasteners to provide extra stability. Likewise, the air inducing scoops can be readily attached in the same manner on the outboard side of the wheel to air holes of the wheel disk in a single wheel construction.

OBJECTS AND ADVANTAGES

It is therefore an object and advantage of this invention to facilitate improved methods for cooling wheel assemblies on automotive vehicles particularly trucks, trailers, buses, and other heavy duty vehicles in order to overcome the above problems; to provide air circulation means especially adapted for trucks, trailers, buses, and other heavy duty vehicle wheels by forcing air through air holes of the wheel disk and over the braking structure in amounts dependent on the speed of the rotating wheel; to provide ample air scooping means for forcing air through air holes of the wheel disk and across the braking structure requiring no power except the rotation of the wheel for drawing air therethrough; to devise air circulation means adapted for wheels of trucks, trailers, buses, and other heavy duty type vehicles without requiring modifications of such wheels; to provide air circulation means adapted for use with dual or paired wheels as well as single wheels; and to devise such air cooling means of economical and durable construction.

DRAWING FIGURES

Our invention will be best understood, together with additional advantages and objectives thereof, from the following descriptions, read with reference to the drawings, in which:

FIG. 3 is a side perspective of the air circulation means.

FIG. 4 is a bottom perspective of the air circulation means.

FIG. 5 is a front perspective of the air circulation means.

FIG. 6 is an isometric view of the air circulation means.

Figure 1:
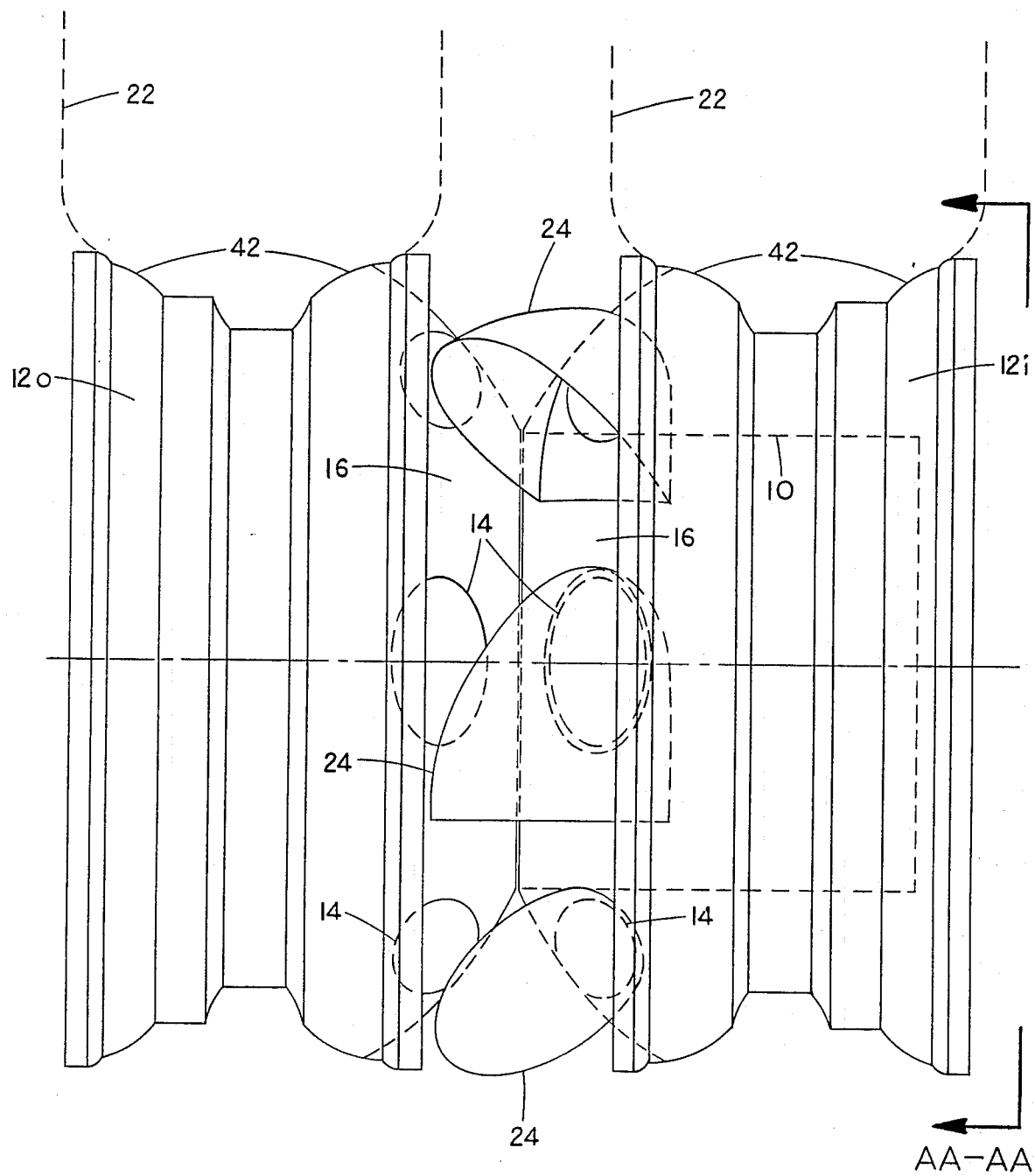
FIG. 1 is a view looking AFT of a specific embodiment of our invention showing a dual wheel assembly and means to circulate air attached to the inboard wheel.

DRAWING REFERENCE NUMERALS:

10 brake drum structure
12i wheel (innermost)
12o wheel (outermost)
14 air holes
16 wheel disk
18 studs
20 stud nuts
22 tires
24 air inducing scoops
26 built-in flexible plastic clips
28 metal fastening brackets
30 screws
38 plastic supporting ridge
42 tire/wheel rim
44 wheel hub structure
48 restricting flange

DESCRIPTION OF INVENTION

A description of the dual wheel assembly shown in the drawings will aid in the understanding of our invention. It should be noted that the air circulation system can also be applied to single wheels. For example, if the outermost wheel 12o in FIG. 1 had been deleted, the air circulation system could still be employed.

The term "disk" will be used in the specification and claims with reference to member 16. This is used according to its normal usage in wheel related fields and is defined as the principal and usually sole annular support between the tire rim 42 and the wheel hub structure 44, and is usually secured to the wheel hub structure 44 by studs 18 and stud nuts 20. The disk is usually a single member of uniform thickness like an object that could be fabricated from a single sheet, but some prior patents have shown essentially two disks or a fabricated member as distinguished from the common disk. Frequently disks are dished in shape as FIG. 1 shows typical dishing in a pair of heavy duty vehicle wheels. Such a disk is to be distinguished from a hub cap which has a sealing or ornamental purpose and is not to support the wheel rim or the wheel hub. The disk could be considered as serving a purpose of rim support on an axle similar to that of spokes in a spoked wheel.

There is a special problem in air circulation in cooling dual or paired wheels, such as 12i and 12o shown in FIG. 1. The tires 22 may be separated by only two to three and a hald inches, and the air openings 14 in disks 16 are relatively limited in area. These factors limit natural air circulation to the brake structure, in this case a brake drum 10 (which is adjacent to the inner wheel disk 16). Brake drum 10, of course, heats during braking as it absorbs energy in slowing the vehicle. Tires 22 heat up from friction with the roadway relative to the amount of energy required to propel the heavy vehicle. As indicated earlier, heating of the brake drum and tires increases in response to in city transit operation, longer trips, hot days, higher speeds, and climbs and descents. The present invention concerns inducing additional air circulation to help cool braking structures and wheels assemblies.

The air inducing scoops are shown as being attached to air holes on the outboard side of the wheel disk 16 of the innermost wheel 12i in FIG. 1. The air input end of the scoop has a greater cross-sectional area than the wheel hole opening attachment end so that the venturi effect at the wheel hole opening end causes the air entering the scoop to accelerate as it passes through the wheel opening hole causing air to be pulled from adjacent the wheel hole on the side of the wheel opposite to the scoop attachment side. Most wheels have two, five, and six air hole openings 14 located adjacent to the wheel rims 42 near the periphery of the wheel disk 16. The number of available air holes located in the wheel disk corresponds directly to the number of air inducing scoops the may attached. For instance, if the wheel disk has five available air holes, five associated air inducing scoops may be attached. If the wheel has two available air holes, two associated air inducing scoops may be attached and so on. Installation requires that both the outermost and innermost wheels be removed 12o and 12i respectively. The air inducing scoops 24 are then snapped into the air holes 14 on the outboard side of the wheel disk 16 of the innermost wheel 12i by means of several, built-in, sturdy plastic clips 26. Additional metal fastening brackets 28 are then attached to the air inducing scoops at the plastic supporting ridge 38 by suitable means such as rivets, screws, or nuts and bolts. In the drawings (FIGS. 3 and 7), the metal fastening brackets 28 are attached by screws 30.

By the way, the wheels 12i and 12o shown in FIG. 1 are meant to be representative of wheels conventionally used especially on heavy vehicles such as trucks, trailers, and buses which, to a degree are rather standard, but vary significantly enough in matters relevant to our invention that particular shapes and sizes of the illustrated invention will be required for attachment to the various wheels. More specifically, as air holes 14 vary in shape and size with regard to varying wheel size, and because a right and left hand air inducing scoop is required so that the opening of the air inducing scoop is facing forward upon forward rotation of the wheel, a number of various shapes and sizes, and a corresponding right and left hand air inducing scoop (which can be said to be mirror images of one another) will be required for wheels of common manufacture. For example, the tubeless 22.5" diameter wheel has an oval shaped air hole that is smaller and significantly different in shape than the tubeless 24.5" diameter wheel. Each of the above mentioned wheels will require right and left handed air inducing scoops specifically designed to fit their corresponding air holes i.e., the air inducing scoop designed to be installed on the right side of a vehicle using a 22.5" diameter wheel cannot be used on the left side of that vehicle and vice-versa. Likewise, the tube type 22" diameter wheel has an air hole that is significantly different from the tube type 24" diameter wheel, and both are also different from each of the tubeless wheels mentioned above. More clearly, each unique wheel, with respect to size and shape of the air holes, will require a right handed air inducing scoop for wheels mounted on the right side of a vehicle, and a left handed air inducing scoop for wheels mounted on the left side of the vehicle. In heavy vehicles, 20", 22", 22.5", 24" and 24.5 inch diameters are common. In lighter vehicles, 15", 16", 17", and especially 16.5 inch diameters are common. The importance of adapting to wheels of present-day manufacture is so that existing vehicles can be outfitted without purchasing new wheels, and so that manufacturers will not have to provide new designs in order for the present invention to be utilized.

Figure 7:
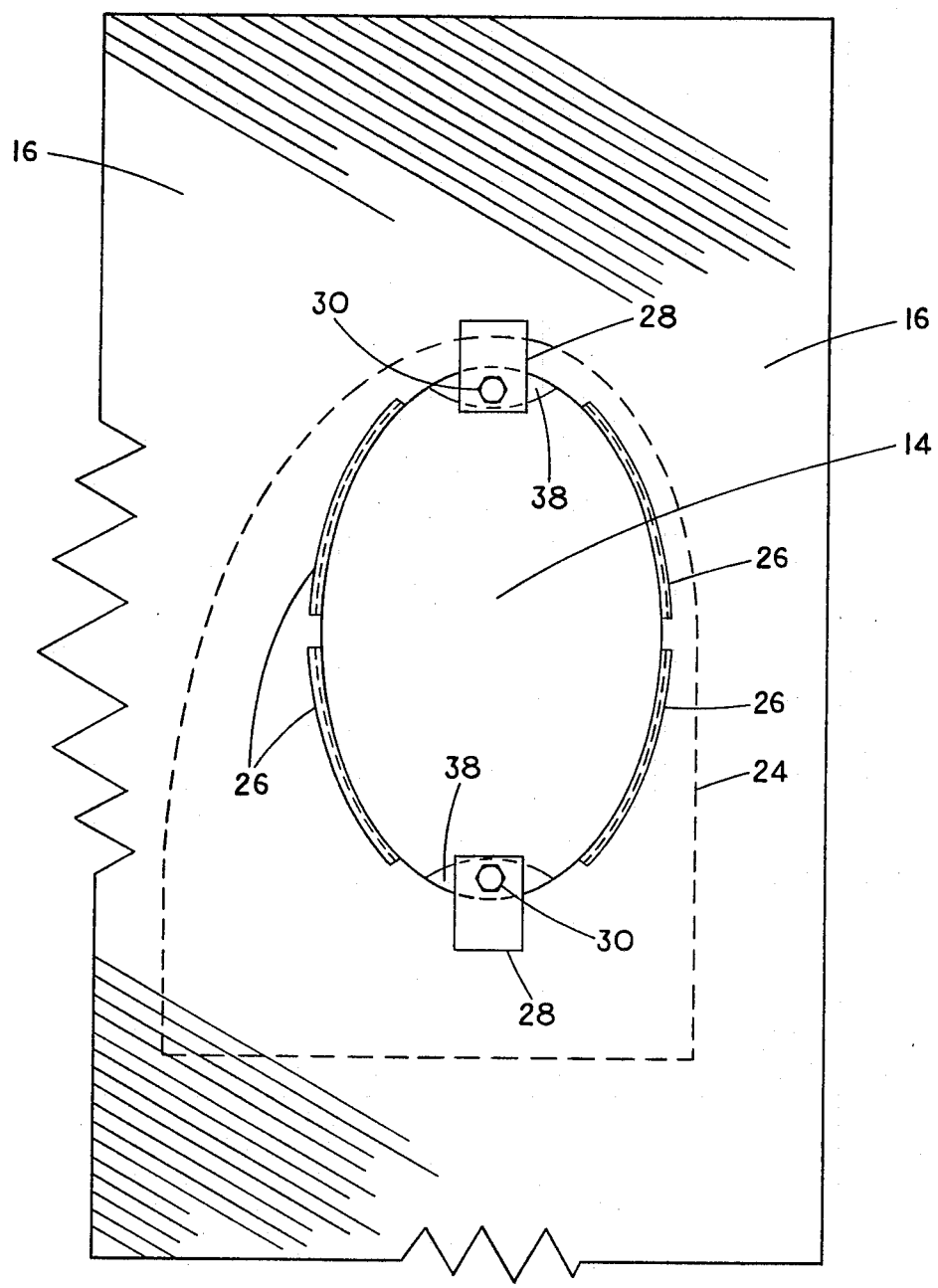
FIG. 7 is a partial view of the wheel disk from the inboard side showing an air hole and attaching means of the air circulation device.

FIG. 7 illustrates how the built-in flexible plastic clips 26 facilitate attachment of the air inducing scoops 24 to the air holes of the wheel disk 16. As shown, the flexible plastic clips 26 will be forced towards the center of the air hole 14 as the scoop 24 is inserted into the air hole 14. The built in flexible plastic clips 26 will then spring back to their normal position, perpendicular to the wheel disk 16, with the lip of the flexible plastic clip 26 overlapping the inboard edge of the wheel disk 16 around the periphery of the air hole 14, and the restricting flange 48 overlapping the outboard edge of the wheel disk 16 around the periphery of the air hole 14 thereby locking the scoop 24 in place. The built-in flexible plastic clips 26 will also restrict lateral or forward movement of the air inducing scoops 24 when the wheel is in motion.

Because the wheel disks 16 tend to vary in thickness from manufacturers, and because other factors affect the thickness of the wheel disks 16, i.e., layers of paint applied to a wheel and wheel disk damage around the periphery of the air hole, metal fastening brackets 28 are attached to the air inducing scoop 24 at the plastic supporting ridge 38 to provide added security.

The said metal fastening brackets 28 will be installed from the inboard side of the wheel after the air inducing scoops 24 are snapped into air holes 14. FIG. 7 illustrates how the metal fasteners will be used to add security. As depicted in FIG. 7, the metal fastening brackets 28 are attached to the air inducing scoops at the plastic supporting ridge 38 by suitable means such as rivets, screws, or nuts and bolts. In the drawings, the metal fastening brackets 28 are attached by screws 30. Once installed, the metal brackets 28 will remain in contact with the inboard side of the wheel disk 16 assuring that the scoop cannot be unintentionally removed from the air hole 14 by extreme or abrupt movements of the vehicle wheel when in motion.

Figure 2:
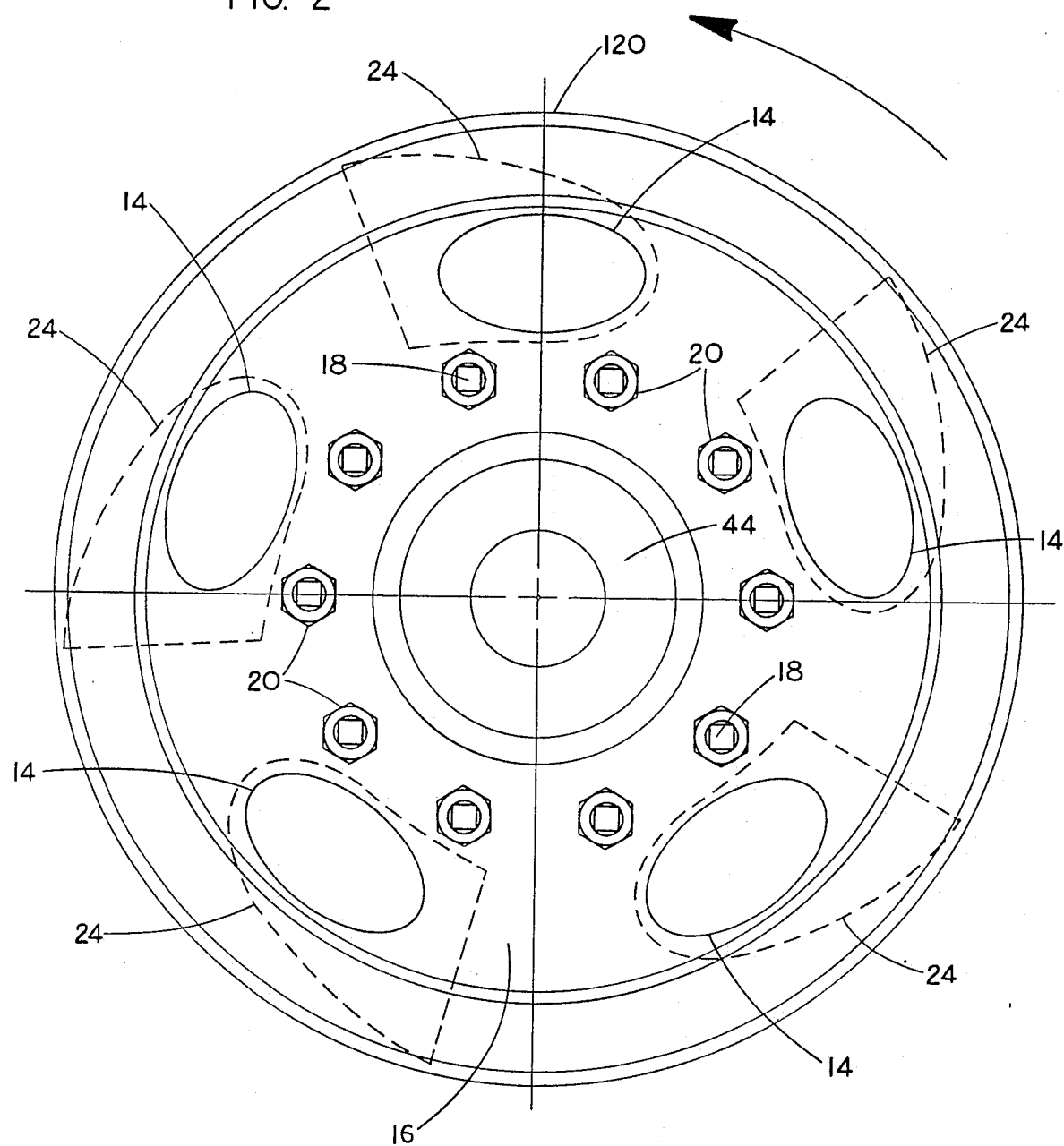
FIG. 2 is a view taken from the cutting plane AA—AA of FIG. 1.

The arrow in FIG. 2 indicates the direction of wheel rotation during forward movement of a vehicle. The air inducing scoops 24 are formed in a manner achieving desired movement of air during such rotation of wheels. The air inducing scoops 24 will be formed in the manner to maximize utilization of the space between adjacent wheels 12i and 12o to achieve the greatest amount of air flow through the air holes 14 of the innermost wheel 12i and over the braking structure 10. The applicable methods of forming and shaping the scoops will be obvious to those skilled in the plastic fabrication arts.

OPERATION

As FIG. 1 depicts, in the case of dual wheels 12i and 12i o, the air inducing scoops 24 are designed particularly to move air from the area between tires 22 and wheels 12o and 12i, and through the air holes 14 of the innermost wheel 12i. During forward rotation, air is scooped between the wheels 12o and 12i, and is exhausted as to a direction perpendicular to the axis of rotaion through the air holes 14 of the innermost wheel 12i, and across the braking structure 10 thereby having a cooling effect on the brakes.

FIG. 1 can also be used to illustrate the use of our invention on on single wheel installation, i.e., an assembly like if the outermost wheel 12o had been deleted from the structure. In this case, the air inducing scoops 24 would be attached to the wheel disk 16 on the outboard side of the single wheel 12i to scoop air from the outside and force it inwardly as to a direction perpendicular to the axis of rotation through air holes 14 and across the braking structure 10 thereby having a cooling effect on the brakes.

While the above description contains many specificities, we do not wish to be understood as limiting ourselves to the exact details shown and described. Instead, we wish to cover those modification of our invention that individuals skilled in the art will envision upon learning the details of our invention, and which fairly fall within the scope of our invention.

We claim:

1. An assembly including an innermost wheel and an outermost wheel, said wheels having dished wheel disks extending from the wheel rims to the attaching location at a wheel hub structure and said wheel disks having air holes located at spaced intervals adjacent to said rims, said assembly including tires on said rims and a brake structure, said assembly including air cooling means comprising:
   (a) said wheels being paired with their disks abutting each other and an air inducing scoop having an air input end being attached to and extending over said associated air holes on the outboard side only of said wheel disk of said innermost wheel in said assembly,
   (b) said air inducing scoops extend from said air holes to substantially occupy the area between said adjacent wheels to collect air upon forward rotation of said wheels and direct that air as a heat dissipating burst over said brake structure at the inboard side of said innermost wheel,
   (c) said air inducing scoops forming cups over each of said associated air holes only on the outboard side of said wheel disk of said innermost wheel as to a direction perpendicular to the axis of rotation whereby air will be impelled generally towards the center of said axis of rotation where said brake structure is located thereby directing a heat dissipating burst over said braking structure situated at the inboard side of said innermost wheel.

2. The subject matter of claim 1 in which right and left handed said air inducing scoops are required for said wheel assemblies mounted respectively on the right and left of a vehicle.

3. The subject matter of claim 1 wherein said air input end of said air scoop is larger in cross-sectional area than the air hole attachment end.

* * * * *